United States Patent [19]

Brafman

[11] 3,899,645

[45] Aug. 12, 1975

[54] PROCESSOR FOR CONTROLLING THE OPERATION OF A TELEPHONE

[75] Inventor: Hanoch Brafman, Tel Aviv, Israel

[73] Assignee: Yeda Research and Development Company Incorporated, Tel Aviv, Israel

[22] Filed: Dec. 11, 1972

[21] Appl. No.: 314,019

[30] Foreign Application Priority Data

Dec. 16, 1971 Israel .................................... 38379

[52] U.S. Cl. .......... 179/90 AD; 179/2 DP; 179/5 R; 179/5 P

[51] Int. Cl.² .......................................... H04M 3/42

[58] Field of Search ......... 179/18 B, 90 BB, 90 AD, 179/2 DP, 5 R, 5 P

[56] References Cited

UNITED STATES PATENTS

| | | | |
|---|---|---|---|
| 3,400,378 | 9/1968 | Smith | 340/172.5 |
| 3,407,269 | 10/1968 | Brzoska | 179/5 R |
| 3,445,601 | 5/1969 | Whitely | 179/6 |
| 3,505,476 | 4/1970 | Kelly | 179/5 R |
| 3,519,745 | 7/1970 | Colman | 179/5 R |
| 3,700,813 | 10/1972 | Colman | 179/5 P |
| 3,761,632 | 9/1973 | Colman | 179/5 P |

*Primary Examiner*—Kathleen H. Claffy
*Assistant Examiner*—C. T. Bartz
*Attorney, Agent, or Firm*—Theodore C. Jay, Jr.; Robert T. Orner

[57] ABSTRACT

Automatic dialing apparatus is disposed between a telephone instrument and a telephone line and includes circuitry for successively placing calls from a repertoire of numbers to be called. The apparatus includes a memory for storing the repertoire of numbers, circuitry for activating the telephone line and for sensing the presence of a dial tone and the absence of an incoming call, circuitry for transferring a selected one of the stored numbers to the telephone line and circuitry for automatically initiating a second dialing cycle if either a busy signal or a ringing signal persists for a predetermined time on the telephone line.

11 Claims, 7 Drawing Figures

PROCESSOR FOR CONTROLLING THE OPERATION OF A TELEPHONE

The increased use of telephones to conduct business has increased the time and effort required to establish actual contact with a person. In response to this problem, it is conventional in many business offices, to channel outgoing calls through an operator who is responsible for placing calls and alerting the calling party only when the called party has answered his telephone. Experience has shown that such an operator usually has a full-time job even in a relatively small office, and repertory dialling systems have been resorted to in an effort to reduce man-power requirements. Conventional dialling systems, however, merely supplement a human operator, reducing, without eliminating, the need for such an operator.

It is therefore an object of the present invention to provide an improved process for controlling the operation of a telephone and capable of successively placing calls from a repertoire of numbers without requiring any human intercession until a call is answered.

In accordance with the present invention, a processor is provided comprising manually operable means to cause a logic circuit to initiate a dialling cycle in which the sending end of a telephone line is automatically activated if the line is available for dialling and a number selected from the active list of a repertoire of numbers is then dialled into the line if a dial tone is present; the logic circuit being responsive, upon completion of a dialling cycle, to either a busy signal on the line or ring back tones that persist for a predetermined period of time for automatically deactivating the line and then repeating the dialling cycle with the next number in the active list of the repertoire; the logic circuit being further responsive, upon completion of a dialling cycle, to either an answer or the absence of line signals for automatically maintaining the activation of the line and actuating an indicator.

As used in this specification, the following terms have the meanings indicated:

"Activation" of the sending end of the line means acting upon the line at the sending end in such a manner that it appears to the central telephone office that the sending station is "off hook";

"On hook" is the condition of the handset of a telephone instrument when the handset is in place on the instrument, while off hook is the reverse condition;

"Dialing" means affecting the sending end of the line in the same way that it is affected by the manual dialling of a number, and includes either periodically interrupting the line, or sending tone frequencies representative of the digits of the number being dialled;

"Busy signal" means a line signal comprising tone bursts whose repetition rate and carrier frequency are characteristic for the telephone system under consideration, of the indication that the called telephone is busy;

"Ring back tone" means a line signal whose carrier frequency, repetition rate and duty cycle are characteristic, for the telephone system under consideration, of the indication that the called telephone is ringing;

"Line signal" or tone burst refers to a signal present in the telephone line and containing information on the status of the line;

"Removing" the handset at the sending telephone instrument includes actually lifting the handset to activate the sending end of the line, or simulating the lifting by means of conventional arrangements for answering a telephone without physically lifting the handset;

An "answer" occurs when the receiving end of the line is activated. In some telephone systems, an answer is manifested by an "answer signal" in the form of a change of state at the sending end of the line (e.g. polarity reversal of the line voltage) or in the form of a supervisory signal injected into the line. In the telephone systems that do not provide an answer signal, an answer may be inferred from a cessation in ring back tones;

"Repetoire" means a list of telephone numbers associated with the processor;

The "Active List" is that part of the repertoire containing the telephone numbers that are currently requesting service; the remaining part of the repertoire is the "inactive list".

In the present invention, a dialling cycle as described above can be initiated only if the line is available, e.g., in the absence of an incoming call, and in the presence of a dial tone. At the end of the dialling cycle, the line remains activated to identify the line signals. Only if the called station answers, or in the absence of line signals within a given time, is an indication given to a human operator that the handset should be removed. Otherwise, the device will continue dialling numbers in the active list of the repertoire until an answer is obtained.

The processor of the present invention may provide for automatically initiating the dialling cycle a predetermined time (termed "dead time") after completion of a call. During this dead time, the sending end of the line is available for accepting incoming calls. The present invention may also provide for deactivating the line and interrupting the automatic nature of the opertion in the event that a call is completed but the handset at the sending end is not lifted within a preselected period of time. The latter situation can arise if the attendant is not present when a call is completed; in this eventuality, resumption of the automatic operation is made dependent on a manual input which can occur only after the attendant returns.

If desired, the lack of a dial tone upon activation of the line can also result in an interruption of the automatic operation of the device requiring manual intercession by the attendant to check whether the line or the device is properly operating. Also optional is the effect that tone recognition has on the repertoire of numbers. An answer may cause the number called to be removed from the active list of the repertoire of numbers either by cancellation or by transfer to the inactive list. If the called station fails to answer within a certain period of time in the presence of ring back tones, the called number may likewise be removed from the active list of the repertoire. On the other hand, a busy number may be retained on the active list so that it may be redialled on the next cycle through the active list. In the event the last described optional feature is incorporated, it may be desired to limit the number of times the processor is able to cycle through the active list. In this manner, a limit is placed on the number of times a busy number can be dialled before an indication is given to the attendant that the active list contains one or more bus numbers. Such indication may be by way of suspending further automatic operation or by a visual or aural indicator.

To distinguish between a busy signal and a ring back tone, where the difference is based on the repetition rate of the tone bursts and their duty cycle, a pulse counting technique can be used. The number of bursts in a period of time will reach a predetermined count in the event the bursts are associated with a busy signal, but will fail to reach the count if the bursts are associated with ring back tones. Alternatively, an integration technique may be used. In such case, an integrator would be charged by each burst and discharged between bursts. A comparator associated with the integrator would set in the presence of a busy signal and remain set for the duration of this signal. On the other hand, in the presence of bursts associated with ring back tones, the state of the comparator will follow the bursts. A busy signal can thus be inferred if the comparator remains set for a predetermined period of time. Where the difference between a busy signal and a ring back tone is based on different carrier frequencies, a frequency discrimination technique can be used to identify the line signal.

If the telephone system under consideration does not provide an answer signal when the receiving end of the line is activated, an answer may be inferred from the absence of line signals within a fixed period of time subsequent either to completion of dialling or to the occurrence of a ring back tone burst.

To enhance noise rejection during tone recognition, the line signal may be sampled at a frequency much higher than the frequency of the tone bursts. If a tone burst is present during the sampling interval, the sampling interval is extended for the duration of the tone burst. If the tone burst persists for a predetermined period of time, a pulse may be produced which is provided to the logic means for analysis.

A called party may be alerted to the fact that the call was placed using the processor of the present invention by providing for a recorded message to be gated into the telephone line at the sending end in the interval of time between the answering of the telephone as indicated by actuation of the indicator, and the lifting of the handset by the attendant. In instances where the telephone system does not provide an answer signal, answering must be inferred from a cessation in ring back tone bursts. In such case, a time interval just greater than the interval between ring back tone bursts, must elapse before it may be concluded that the called station has answered. To make the recorded message available to the called party during this time interval the above described sampling system may be utilized to gate the recorded message into the telephone line between ring tone bursts and until either the handset of the telephone at the sending end of the line is lifted or the expiration of the preselected period of time subsequent to actuation of the indicator. Such recorded message may be derived from an endless tape which may advise the called party as to the identity of the calling party and request him to stay on the line.

For a better understanding of the present invention, and to show how it can be carried out in practice, reference should be made to the accompanying drawings, wherein.

Figure 1:
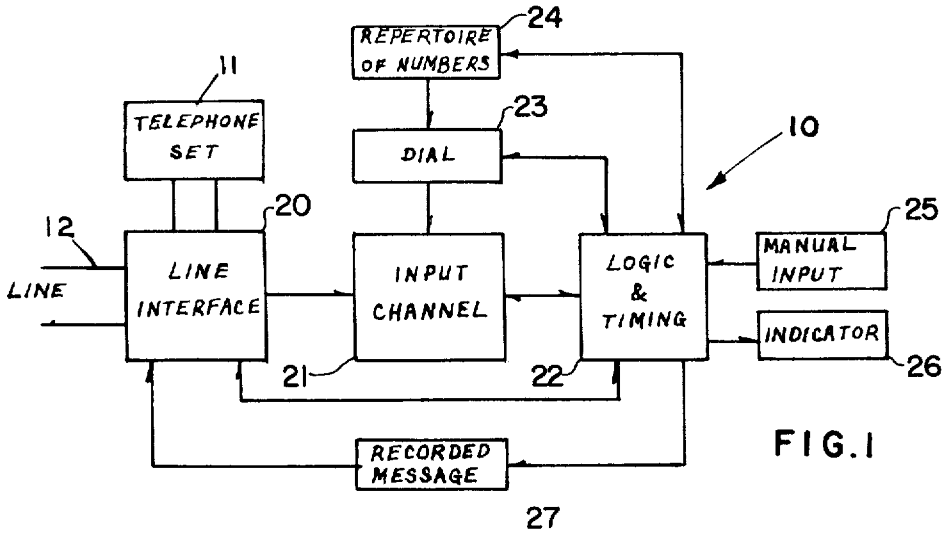
FIG. 1 is a simplified block diagram showing the major components of the processor of the invention.

Referring now to FIG. 1, reference numeral 10 designates a processor according to the present invention interposed between a telephone set 11 and a telephone line. Such a dialling system may be used, for example, in a situation where a party with access to the telephone set 11 wishes to contact one or more individuals whose telephone numbers have been stored in the repertoire in the memory 24. With the handset of the telephone 11 in place, operation of the manual input 25 by an attendant will initiate an automatic series of events which terminates only upon the answering of a telephone corresponding to a number in the repertoire of the numbers. The first event is the initiation of a dialling cycle which begins with activation of telephone line 12 in the absence of an incoming call. If the input channel 21 senses the presence of a dial tone after activation of the line, the logic and timing circuits 22 place the repertory dialling system 10 into a dial mode causing a number selected from the active list of the repertoire of numbers to be dialed into the telephone line by the dial simulator 23. Upon completion of the dial mode, the logic and timing circuit places the dialling into a tone identification mode for the purposes of identifying line signals on the telephone line 12. If the input channel 21, via line interface 20 detects either a busy signal on the line, or a ring back tone that continues for a predetermined period of time indicating that the called party has not answered his telephone, the logic and timing circuit will automatically deactivate the line 12 for a fixed period of time. In the preferred embodiment, a busy signal will cause the number to be retained in the active list of the repertoire, while a "no answer" will cause the number to be transferred to the inactive line.

During the fixed period of time that line 12 is released the telephone set 11 will operate in a conventional manner and will be able to receive incoming telephone calls. At the termination of the fixed period of time, and in the absence of an incoming call, the logic and timing circuit will repeat the dialling cycle with the next number in the active list.

While the system 10 is in the tone identification mode, the logic and timing circuit 22 will respond to either an answer or the absence of tone bursts on the line by maintaining an active and actuating an indicator that signifies the need for human intercession. In the preferred embodiment an answer will cause the number to be transferred from the active to the inactive list of the repertoire.

In the event the attendant removes the handset of the telephone instrument 11 within the preselected period of time subsequent to actuation of the indicator, the logic of timing circuit will yield control of the line to the attendant. Upon replacement of the handset, the logic and timing circuit will suspend further automatic operation until the expiration of a fixed period of time during which incoming calls may be received by the telephone set 11 in a conventional manner. Upon the termination of this dead time and in the absence of an incoming call, the logic and timing circuit causes the repertory dialling system to resume its automatic operation initiating the next dialling cycle using the next number down the list.

In the event the attendant fails to remove the handset within a preselected period of time subsequent to actuation of the indicator, the logic and timing circuit is effective to interrupt the automatic operation of the system and suspend further activity until the attendant supplies a further manual input.

Once the manual input of the system has been operated, no additional manual operation is involved until the actuation of the indicator signals the attendant to remove the handset from the telephone. The indicator is actuated whenever the called party answers his telephone or whenever a situation is encountered which requires human interpretation. For example, the indicator is actuated in the absence of a dial tone following activation of the telephone line. This may be indicative of a defect in the telephone system and human intercession is the easiest way in which to check for this condition.

The indicator is also actuated in the absence of any tone bursts when the system is in the tone identitication mode. The lack of tone bursts may arise when the call has been completed without generating a ring back tone, or when there is a defect in the telephone system preventing the capture of the called telephone line. Again, human intercession is the eaiest way in which to resolve these two possibilities. In the absence of actuation of the indicator, the system 10 continues automatically without requiring any human intercession.

In order to hold the attention of the answering party on the line in the interval between his answering and removal of the handset at the sending end of the line, a recorded message may be gated into the sending end of the line in this time interval requesting the called party to stay on the line until the attendant removes the handset. If the telephone system under consideration does not provide an answer signal, an answer can be inferred from a cessation in ring back tone bursts which requires a predetermined waiting period before concluding that the call has been answered. To account for this period of time, a recorded message may be gated into the telephone line prior to and between the ring back bursts utilizing the sampling circuit shown in simplified form in FIG. 2.

The sampling circuit oscillates at a natural frequency considerably higher than the repetition rate of the line tone bursts. In the presence of a tone burst during the narrow sampling interval, the sampling interval is extended for the duration of the tone burst. In the period between sampling intervals, a recorded message is gated into the line. The recorded message will thus be present on the line when the receiving end goes off hook. The recorded message will remain on the line until the attendant at the sending end removes the handset in response to actuation of the indicator. The logic and timing circuit responds to such removal by disabling the recorded message, deactuating the indicator, and surrendering the line to the attendant.

I. MAIN COMPONENTS OF SYSTEM

Figure 3:
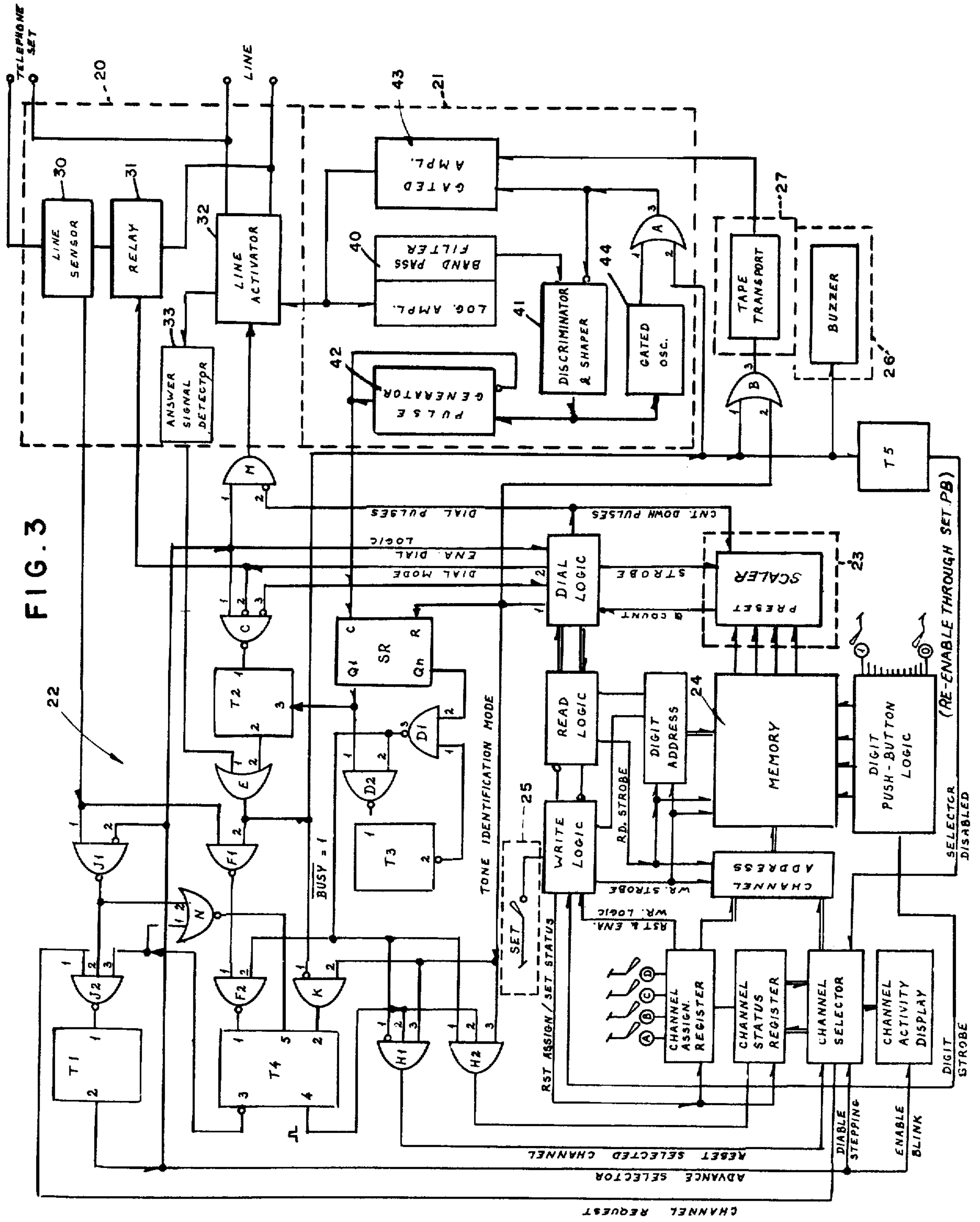
FIG. 3 is a detailed block diagram of the processor according to the present invention.

As shown in FIG. 3, the components of the repertory dialling system 10 comprise: line interface 20, input channel 21, logic and timing circuits 22, dial simulator 23, the repertoire of numbers 24, a manual input 25, an indicator 26 and a tape transport 27.

A. Components of line interface 20

Line interface 20 comprises the following components: line sensor 30, relay 31, line activator 32 and, whenever appropriate, answer signal sensor 33.

The line sensor 30 is essentially a handset position sensor and a ring detector whose state indicates the status of the line. One a cycle is initiated, the sensor is ineffective until either the end of the cycle or the indicator is actuated.

When the telephone instrument rings, or its handset is removed, the output of the line sensor 30, which is connected to input 1J1 of the logic and timing circuits, has a "high" value; but when the telephone line is available, the output of the line sensor has a "low" value. For reference purposes herein, the state of a component producing a "high" output is termed the ONE state, whereas the state of the component when it produces "low" output is termed the ZERO state. With this definition, the output of line sensor 30 will change from ZERO to ONE whenever the handset is removed from the telephone instrument, or an incoming telephone call is received. On the other hand, the output will change from ONE to ZERO upon replacing the handset of the instrument.

Relay 31 operates to selectively disconnect the telephone instrument from the telephone line. The input to the relay is obtained from output 2 of the dial logic. When the input to the relay is ZERO, the relay is inactive and the telephone instrument is connected to the line. On the other hand, when the input is ONE, the relay is activated and the receiver is disconnected from the line. Relay 31 may take the form of a conventional mechanical contactor or may be in the form of a solid state device.

Line activator 32 is essentially a switch that terminates the telephone line through a characteristic impedance, in accordance with the state of gate M. When the output of gate M is ONE the impedance is connected across the line to activate it and permit signals on the line to pass into the input channel 21 and signals from the gated amplifier to pass into the telephone line. When the output of the gate M is ZERO, the impedance is disconnected from the line.

The answer signal sensor 33 is useful only in the event that the telephone system provides an answer signal (e.g., polarity reversal of the line voltage) when the receiving end of the line is activated. The output of the sensor 33 will change from ZERO to ONE when the party at the receiving end of the telephone line answers his telephone. If the telephone system does not provide answer signals, or in the absence of an answer signal when the system provides such signals, the output of sensor 33 will be ZERO. The sensor 33 is included with the other logic shown in FIG. 3 to detect activation of the receiving end of the line to provide a universal device compatible with all types of telephone systems.

B. Components of input channel

The input channel comprises the following components: amplifier/filter 40, discriminator/shaper 41, pulse generator 42, gated amplifier 43, and gated oscillator 44.

The logarithmic amplifier of component 40 ensures that the input channel will have a wide dynamic range with high noise immunity. Following the amplifier may be an active band-pass filter centered at the carrier frequency of the line signals provided. The output of the band-pass filter is supplied to discriminator/shaper 41 which generates, for each cycle of the carrier, an output pulse of predetermined amplitude and duration.

The discriminator 41 is enabled when the output of gate A at terminal 3 is ZERO causing it to operate in the manner described above. In the event that the output at terminal 3 of gate A, is ONE, the discriminator is disabled preventing any signals passed by the amplifier/filter 40 from reaching the pulse generator 42 of the input channel.

The pulse generator 42 comprises an integrator followed by a comparator circuit. In its quiescent state, the integrator is clamped to a low level by an internal discharge current. If the signal provided by discriminator/shaper 41 persists for a predetermined period of time the integrator will charge to the upper trigger level of the comparator which will then change state in a regenerative fashion establishing a low level trigger point. In one mode of operation, the active comparator disconnects the pulse generator from the input channel and provides an additional discharge current to the integrator allowing the latter to discharge at a predetermined rate. When the integrator output reaches the comparator low-level, the pulse generator reverts to its quiescent state and is reconnected to the input channel.

During the time that the comparator is in its active state as previously described, the output of the pulse generator 42 is ONE.

Figure 4:
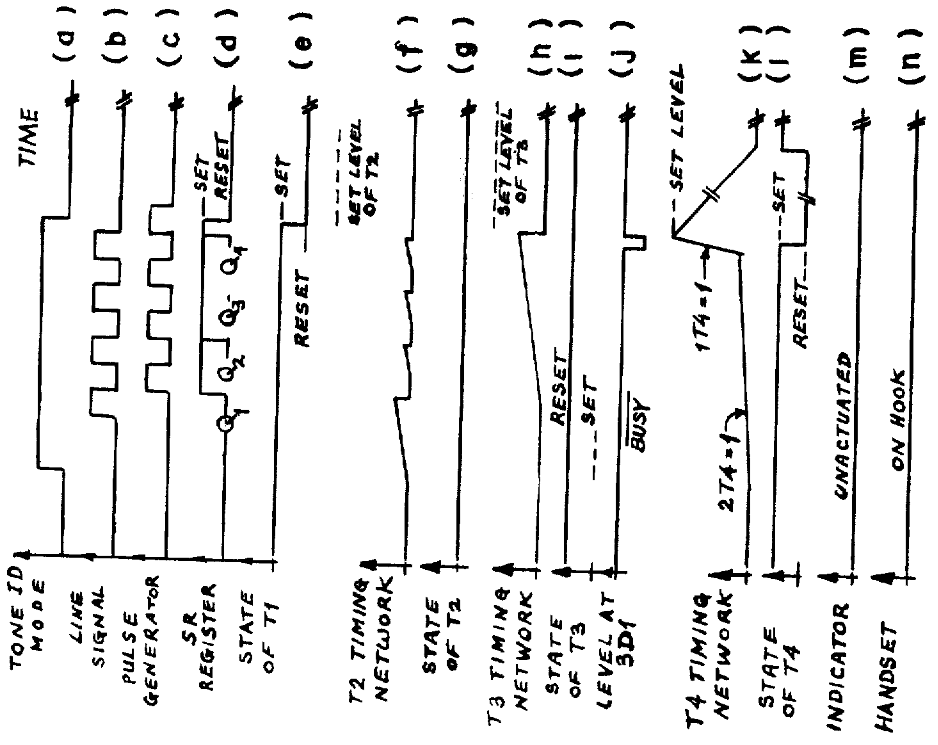
FIG. 4 shows wave forms and states of various components of the processor in response to a busy signal.

The repetition rates and duty cycles of a typical busy signal and ring back tones are shown schematically in FIG. 4(*b*) and 5(*b*) respectively, to which reference is now made. The output of discriminator/shaper 41 must persist for approximately half a second in order for the integrator of pulse generator 42 to reach the upper trigger level of the comparator. Once the generator sets, it will remain in its active state for approximately half a second providing an output pulse of this duration, as shown in FIGS. 4(*b*) and 5(*b*).

In the manner described above, the pulse generator 42 will produce, for each ring tone burst and for nearly each busy tone burst appearing in the telephone line, a single pulse of a fixed duration. Noise or spurious signals at the carrier frequency of the telephone line not persisting for at least half a second will be rejected by the input channel.

The input channel also responds to a dial tone. A dial tone is a continuous carrier signal which will cause the pulse generator to product its characteristic pulse approximately half a second after the dial tone appears. The first pulse produced by the dial tone is useful to shift the repertory dialling system into its dialling mode.

Figure 2:
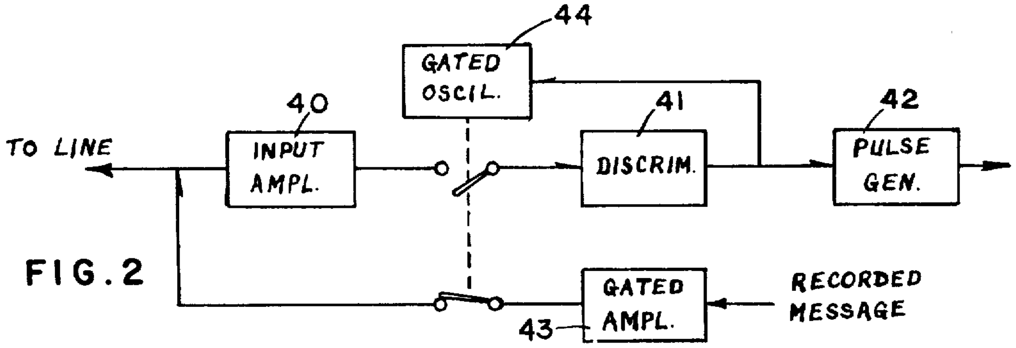
FIG. 2 is a simplified block diagram of the sampling circuit.
Figure 2A:
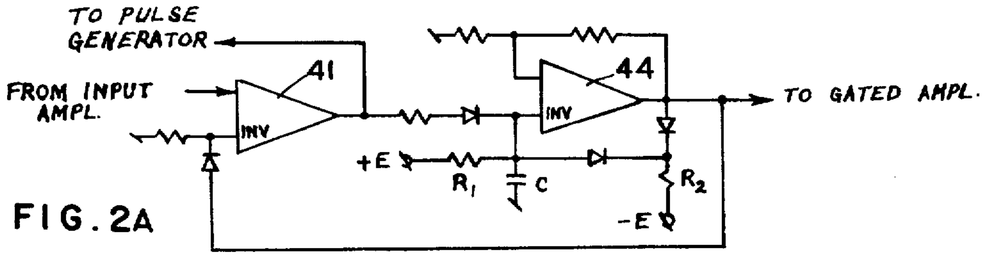
FIG. 2A is a simplified circuit diagram of the gated discriminator and oscillator.
Figure 2B:
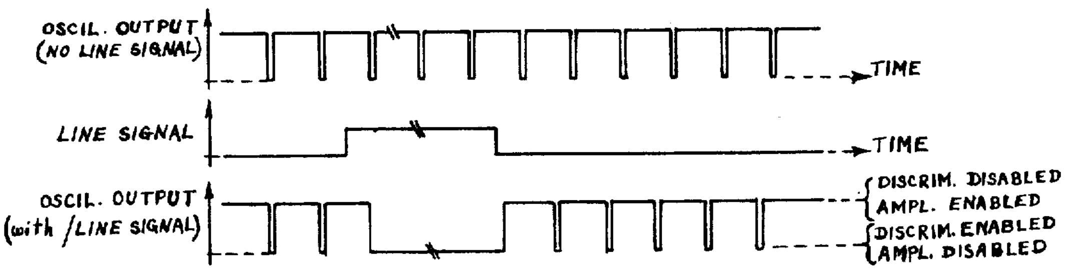
FIG. 2B shows the wave forms associated with the sampling circuit.

Turning now to gated oscillator 44, its normal mode of operation provides to terminal 1 of gate A, a chain of pulses having a frequency of about 10 Hz. and a pulse width of approximately 10 milliseconds as shown in FIG. 2(*b*). The input to terminal 1A (terminal 1 of gate A) will be a ZERO during the pulse interval produced by oscillator 44, and will be ONE between pulses. If the input to terminal 2A is ZERO, the output of OR-gate A appearing at terminal 3A will follow the input at 1A. The output of gate A is applied to control the operation of discriminator 41 and gated amplifier 43. When the signal and terminal 3A is ZERO, the discriminator/shaper 41 will be enabled and will operate as described above, while the gated amplifier 43 will be inhibited; and when the output at terminal 3A is ONE, the discriminator 41 will be disabled while the gated amplifier 43 will be enabled. As a consequence of this arrangement, the discriminator/shaper 41 will in effect sample the output of amplifier/filter 40 at a 10 Hz. rate.

The duration of a dial tone, a busy or a ring tone burst, is considerably longer than the natural sampling period of the gated oscillator 44. When a line tone is encountered during sample, the discriminator generates an output which will clamp the gated oscillator to its low level achieving two results: (1) the discriminator will remain enabled; and (2) the gated amplifier 43 will be gated off for the duration of the tone burst. If the tape transport 27 is running, the recorded message will be blocked by the amplifier and will not appear on the line. When the tone burst on the line terminates, the output of discriminator 41 terminates unclamping oscillator 44 which reverts to its normal mode of operation.

By further inhibiting the gated amplifier for the duration of the active state of the pulse generator, the gated message is removed from the line for the duration of the tone burst and about a half second thereafter. As a result, the message is available prior to and in between bursts of the ring back tone, but inhibited for the duration of a busy signal. The operation of the gated amplifier 44 develops frequent, but very narrow, windows in the audio message delivered by the tape, but the message will still easily intelligible. When the indicator is active, the message is gated on continuously and the input channel is inhibited.

Input channel 21 discriminates very severly against spurious signals on the telephone line because discriminator 41 is capable of accepting unwanted signals only 10% of the time. In addition, to reach the level required to drive the discriminator 41, The signal must be within the prescribed frequency band and persist long enough to permit the integrator of the pulse generator 42 to reach its triggering level.

C. Logic and timing circuits

The logic and timing circuits 22 have three main types of components: (1) timing circuits; (2) gates; and (3) logic associated with storage and dialling.

1. Timing circuits

The timing circuits comprise an operator simulator circuit T1, a pulse interval timer circuit T2, a busy signal detector comprising busy signal timer T3 and shift register SR, a dead time and control generator T4 and attendant signal timer T5. Circuit T1 is a timing network followed by a level discriminator or comparator. When the input to this circuit at 1T1 is high (ONE) the circuit is in its quiescent state; and the output at 2T1 will be low (ZERO). When the level at 1T1 goes to ZERO, the circuit will set following a time delay causing the output at 2T1 to change from ZERO to ONE. The circuit will remain in its set state until the signal at 1T1 goes from ZERO to ONE.

Circuit T2 is essentially an integrator having two different time modes, followed by a comparator which changes state when the voltage on the integrator reaches a predetermined level. When the signal at 1T2 is high, the circuit is in its reset condition in which the level at 2T2 is ZERO. As the signal at 1T2 goes to ZERO, the circuit is initiated which means that the integrator begins to charge towards the turn-on level of the comparator at a rate dependent on the level at 3T2. When the level at 3T2 is low, the integrator will require approximately eight seconds to reach the trigger level; when the level at 3T2 is high, the turn-on level will be reached in about five seconds. When the turn-on level is reached, circuit T2 sets causing the level at 2T2 to change to ONE. Circuit T2 will remain set until the signal at 1T2 goes to ONE. When the signal at 1T2 goes to ONE the circuit T2 resets rapidly.

The busy signal timer T3, which is a part of the busy signal detector, is very similar in operation to circuit T2 except that circuit T3 will set a fixed time after it is initiated. When the signal at terminal 1T3 is high, the circuit T3 is in its reset state and the level at 2T3 is ONE. When the signal at 1T3 (1D1) goes to ZERO, about 7 seconds are required before T3 sets, at which time the level at 2T3 goes to ZERO. Circuit T3 is reset when the signal at 1T3 again goes high.

The shift register SR of the busy signal detector has four bits. When the level at the reset terminal R is low, all the bits of the register are reset, and it will not respond to the application of pulses to the input terminal C. The shift is enabled when the level at reset terminal R goes high permitting it to respond to pulses produced by the pulse generator 42 of input channel 21. The first such pulse will change the state of bit Q1 from ZERO to ONE. This bit is connected to 3T2 and its active state changes the time constant associated with timing circuit T2. Successive pulses will set additional bits of the shift register.

By reason of the operation of gates D1 and D2 described below, timing circuit T3 is initiated by the setting of the first bit Q1 of shift register SR. Busy tone bursts will cause the pulse generator 42 to produce pulses rapidly enough for the state of the fourth bit of shift register SR to change to a ONE before timing circuit T3 sets. In the case of a ring back tone, timing circuit T3 sets before the state of the fourth bit of register SR changes to ONE due to the low burst rate involved. Once T3 has been set, it remains active until the end of the service routine, namely until timing circuit T1 is reset.

Referring now to dead time and control generator T4, it is essentially a timing network followed by a regenerative comparator circuit. Normally, the signal level is low at each of the input terminals to dead time generator T4: 1T4, 2T4 and 5T4. The circuit is initiated when the signal level at input 2T4 goes to ONE causing the timing circuit to begin charging slowly towards a turn-on level.

In the presence of a ring back tone, the time required for the integrator to reach the turn-on level following the completion of dialling establishes a time limit for ringing the called station.

When the timing network reaches the turn-on level, timing circuit T4 sets in a regenerative manner; whereupon, the output level at terminal 3T4 of the circuit goes to ONE and a narrow output pulse appears at terminal 4T4 of the circuit.

Circuit T4 may be set any time subsequent to initiation if the signal level at input 1T4 of the circuit goes to ONE causing the timing network to charge rapidly to the turn-on level. This situation occurs, as will be described below, when a busy signal is detected or when the handset has been removed following the setting of the pulse interval timer T2. If the level at input 5T4 goes to ONE, which can occur only when T4 is set and the handset is removed, the circuit will latch to its active state until the handset is replaced causing input 5T4 to go to ZERO.

Having been set, the network of circuit T4 begins to discharge toward a turn-off provided its inputs 1T4, 2T4 and 5T4 are all at a low level. The time required to reach this level is the "dead time" referred to above. When the turn-off level is reached, circuit T4 resets in a regenerative manner.

Attendant signal timer T5 comprises an integrator in combination with a comparator circuit. T5 is initiated by the setting of either the pulse interval timer T2 or the answer signal sensor. The interval of time required for the integrator to reach the turn-on level of the comparator is the time available for the attendant to gain control of the established line to the exclusion of the system by removing the handset from the telephone instrument. If the handset is not removed before the circuit T5 sets, the resultant signal causes the automatic operation of the system to be suspended by disabling the channel request until push button 25 is manually depressed.

2. Gates

Gates A, B and E are OR-gates; gate N is a NOR-gate; D2, F1, F2, J1 and J2 are NAND-gates; and gates H1, H2, K, M and R are AND-gates.

3. Logic associated with dialling

Memory 24 has a capacity of four words, or channels as referred to hereinafter. Each channel has a storage capacity of 16 binary-coded-decimal digits.

The channel assignment register comprises a quadruple bistable latch associated with push button A, B, C and D corresponding to the four channels of the memory. When one of these push buttons is manually depressed a specific associated bistable bit is set insuring the reset of the remaining bits, and providing access to the corresponding channel in memory 24.

The channel status register comprises four flip-flops each of which is associated with one of the channels in memory 24. If a channel status bit is set, the telephone number associated with the bit is placed in the active list to be processed automatically. On the other hand, if a channel status bit is reset, the telephone number associated with the bit is removed from the active list of the repertoire.

The channel selector is essentially a pointer which sequentially samples the states of the bits in the channel status register. When enabled, the selector will step from bit-to-bit, until it encounters a set bit (termed the selected status bit); and further sampling by the channel selector is suspended. The channel associated with the selected status bit is the channel selected for dialling. Associated with the channel selector is a counter which counts the number of times the channel selector has cycled through the active list. When this counter reaches a fixed number, say decimal 4, it will set and disable the channel request until the set push button on input 25 is depressed. This arrangement limits the number of times a busy number can be called before human intercession is required. The setting of this register is also accompanied by the setting of the timer circuit T5. Depression of the SET push button resets this register.

The channel activity display comprises four indicator lamps, associated with the corresponding channels; and a monitor lamp associated with the state of the channel selector counter. An indicator lamp is turned on when the associated channel is placed on the active list. The lamp blinks when its associated channel is being serviced. The monitor lamp acts as a power "on-off" indicator in the absence of an active list. During a service routine, the lamp monitors the line signals, and blinks with the setting of the channel selector counter indicating that automatic operation is suspended subject to a manual setting.

The digit push button logic has 10 push buttons corresponding to the decimal digits of a telephone number. A telephone number to be called is inserted into the memory be manually depressing the push buttons associated with its digits.

In summary, there are three manual inputs involved in presetting the repertory system; the four channel assignment push buttons, the 10 digit push buttons, and the single SET push button of manual input 25. By means of these manual inputs, four telephone numbers may be inserted into memory 24 to establish the repertory of the dialling system.

D. Dial simulator circuit

The dial simulator may include a preset scaler 23 into which the digits of the number to be dialled are sequentially inserted. The dial logic operates in conjunction with the preset scaler to interrupt the line activator 32 a number of times equal to the decimal contents of the scaler 23. In this manner, dialling of a number is simulated.

E. Repertoire of numbers

The repertoire of numbers comprising an active list and an inactive list, is contained in a suitable memory whose operation is described in detail below. The numbers in the active list are the numbers in the channels whose associated status bits are set; the numbers in the inactive list are the numbers in the channels whose associated status bits are reset. Numbers may be transferred from the active list to the inactive list in response to line signals. For example, a number that answers may be transferred automatically from the active list to the inactive list. Numbers in the inactive list may also be transferred to the active list in response to manual depression of the proper push button of the channel assignment register followed by manual depression of the SET push button 25 described below. Provision may be made for numbers to be made a permanent part of the repertoire, and transferred as needed into the active list.

F. Manual input

Manual input 25 performs the following functions; when activated following the introduction of a new telephone number it indicates to the write logic the termination of the number and places the number on the active list. When the manual input is activated immediately following the actuation of a channel assignment push button the corresponding number is placed on the active list. The manual input restarts the automatic operation of the processor when such operation is suspended due to a failure on the part of the attendant to remove the handset subsequent to actuation of the indicator within the allotted time, or due to the setting of the recycle counter associated with the channel selector.

G. Indicator

Indicator 26 is in the form of a buzzer or other aural indicator and may include visual means such as a blinking light or the like.

H. Tape

Tape transport 27 includes a conventional tape deck and an endless magnetic tape containing a suitable recorded message. The amplifier for the tape is designated by numeral 43. When the output of gate B is high, the tape deck is energized and the tape is driven past a pick-up head (not shown) which supplies an audio input to gated amplifier 43.

II. INSERTING TELEPHONE NUMBERS INTO REPERTOIRE

A telephone number may be inserted into the repertoire by an attendant in the following manner. First, the availability of a channel in the memory is ascertained by the attendant from inspection of the channel activity display. If the lamp associated with a given channel is blinking, the channel is in current use and the number contained therein is currently being dialled or has already been dialled, and the system is awaiting either tone identification or the answering of the telephone. If the lamp of the given channel is continuously illuminated, there is a number in the channel which is available for dialling during the sequential operation of the selector switch. If a channel lamp is not illuminated, a number stored in the corresponding channel in memory 24 is not available for dialling.

From an inspection of the channel activity displayed, an attendant may select a channel whose lamp is not illuminated, or may select a channel whose lamp is illuminated if he wishes to exclude an active telephone number from the automatic operation of the system. The attendant makes his selection by depressing one of the appropriate push buttons A through D of the channel assignment register. Depression of a channel assignment push button achieves the followinig results: the bit of the channel assignment register corresponding to the selected channel is set, and all other bits of this register are reset; the bit of the channel status register corresponding to the selected channel is reset; and the write logic is reset and enabled in preparation for inserting the new telephone number into memory 24.

The desired telephone number is inserted in memory 24 by sequentially depressing the push buttons associated with the digit push button logic. Upon the depression of a given digit push button, a digit strobe is issued to the write logic. In the absence of a read operation, which occurs when a digit is being deposited into the preset scaler, the write logic will issue a write strobe which will deposit the contents of the digit in the proper channel of memory 24 as determined by the set digit of the channel assignment register. The digit address, which is the memory location of the particular digit is determined by the contents of a write counter that forms a part of the write logic. Having deposited the first digit in the memory location determined by the assignment bit and the write counter, the write logic adds 1 to the write counter in preparation for the insertion of the next digit. The process described above is repeated for all digits contained in the telephone number.

The introduction of a new number is completed by actuating the set push button 25 which deposits zeros in the remaining digit locations. When a zero has been inserted in the last digit location, the channel status bit will be set as the corresponding assignment bit is reset and the write logic is inhibited.

The set status bit causes the corresponding indicator lamp of the channel activity display panel to be illuminated, indicating that the number contained in the corresponding channel has been placed on the active list.

The above described process may be repeated for all four channels of memory 24. In such case, all four bits of the channel status register will be set, and all four lamps of the channel activity display panel will be illuminated.

If an error is made while inserting a number in a given channel, reactivation of the push button associated with the channel will reset the write counter permitting the number to be re-inserted. A number contained in the memory may be re-enabled for dialling by activating its assignment push button followed by the actuation of the set push button.

III. AUTOMATIC OPERATION

A. Preliminary operation

Upon the initial depression of the set push button of manual input means 25, the logic of the system shown in FIG. 2 will cause circuit T1 to set. Circuit T1 will set when all inputs of gate J2 are ONE. The level at input 1J2 of this gate will be ONE when the channel selector points to an active status bit of the channel status register; the level at input 2J2 will be ONE when the line is available; and the level at input 3J2 will be a ONE when circuit T4 is in its reset state indicating the absence of "dead time". When all inputs to gate J2 are ONE, the inverted output of this gate will go to ZERO, which causes the timing circuit T1 to set as described above.

The setting of circuit T1 causes the following events to occur; activating the line through gate M and connecting it to the input channel, blinking of the lamp associated with the selected channel, enabling of the dial logic, disabling of the stepping of the channel selector, and initiation of circuit T2. When T1 sets, the level at input 1C of gate C changes from ZERO to ONE so that all three inputs to gate C will be ONE, causing the inverted output of this gate to change to ZERO. A ZERO at the input terminal 1T2 of circuit T2 causes this circuit to be initiated as described above. Because bit Q1 of shift register SR, is initially reset, a ZERO will be present at input terminal 3T2 of timing circuit T2 with the result that circuit T2 will set approximately 8 seconds after it is initiated in the event that a dead tone is not present.

B. Dial routine

If a dial tone is detected within 8 seconds following activation of the line, the timing network of circuit T2 will be reset, and the device will enter a dial mode of operation in which a number in the repertoire is dialled into the line. At the completion of dialling, the device will enter a tone identification mode. Recalling that circuit T2 was originally initiated when circuit T1 was set, the pulse produced by pulse generator 42 in response to the detection of a dial tone will change the level at input 3C of gate C to a ZERO which changes the level at input 1T2 of circuit T2 to a ONE thereby resetting the circuit. Since the system is now in a predial mode, the pulse produced by pulse generator 42 will activate the dial logic changing the level at output 2 of the dial logic to a ONE disconnecting the telephone receiver from the line and holding circuit T2 in its quiescent state.

With the dial logic activated, the system enters a dial mode wherein the dial logic issues a read request to the read logic which generates a read strobe in response. This strobe causes the contents of the memory location specified by the channel selector and the read counter, which forms part of the read logic, to be transferred into the preset scaler 23. The read counter is indexed by the trailing edge of the read strobe in preparation for the next read operation. The dial logic generates dial pulses in accordance with the contents of the preset scaler, the pulses serving to inhibit gate M and interrupt the line activator 32. The trailing edge of the dial pulses subtract from the contents of the preset scaler. When the contents of the scaler reaches ZERO, a new read request is issued, provided no overflow of the read counter has occurred. The cycle described above is repeated until overflow occurs and the preset scaler contains a ZERO. The dial mode of operation is now terminated, and the system enters the tone identification mode wherein the level at terminal 1 of the dial logic goes to ONE and the level at terminal 2 of the dial logic goes to ZERO.

As the system enters the tone identification mode, the tape transport is turned on by reason of the signal level at terminal 1 of the dial logic which passes through gate B. In addition, the shift register SR is enabled because the level at terminal R of this register is now at a ONE. The inputs at each of terminals 3H1 and 3H2 of gate H1 and H2 are also at a ONE level in preparation for responding to ring or busy tone bursts in the line. The input at 2K of gate K also goes to a ONE causing the output of this gate to go to a ONE thus initiating timing circuit T4. As the level at terminal 2 of the dial logic goes to ZERO, the telephone receiver is reconnected to the line and circuit T2 is initiated.

The system is now awaiting detection of tone bursts that may appear on the telephone line. If a tone burst appears within the longer timing interval (8 seconds) of circuit T2 following the dialling operation, the pulse generated by the input channel sets bit Q1 of the shift register SR, resets the timing network of circuit T2 and inhibits this circuit for the duration of the pulse. With bit Q1 of the shift register set, the timing circuit of T3 is initiated through gate D2 and the timing interval of circuit T2 is shortened to approximately 5 seconds due to the ONE level at input 3T2.

If another burst follows within 5 seconds of the previous burst, the newly generated pulse sets the next bit of shift register SR, resets the timing network of circuit T2 and inhibits this circuit for the duration of the pulse.

In the presence of additional tone bursts the process as described above continues subject to the following conditions:

1. Busy signal

If the tone bursts constitute a busy signal as shown in line (*b*) of FIG. 4, the $n^{th}$ bit of shift register SR will set prior to the setting of T3, as shown in line (*d*) and (*h*) of FIG. 4, due to the frequency at which the bursts of a busy signal occur, and input 2D1 of gate D1 will change to a ONE. In response, the inverted output of this gate goes to a ZERO inhibiting D2 and resetting the timing network of T3.

The resultant change in level at terminal 2F2 of gate F2 due to the level at output of gate D1 immediately sets circuit T4 as shown in line (k) of FIG. 4 generating a narrow pulse at 4T4 and providing an active zero level at 3T4. The low "busy" level at terminal 1H1 gates the pulse appearing at terminal 2H1 through gate H1 and serves to advance the channel selector while retaining the number on the active list of the repertoire. The active low level at 3T4 inhibits gate J2 causing the timing circuit T1 to reset shortly thereafter. The resetting of circuit T1 deactivates the line by inhibiting gate M, resets the dial log and the timing network of circuit T2, and enables the stopping of the channel selector. Consequently, shift register SR is reset and the timing network of T4 is discharged. The time required for T4 to react to its quiescent state constitutes the system "dead time". Following the dead time, automatic operation resumes with the next number down the active list or the same number in the absence of additional call requests.

2. Ring, but no answer

If the tone bursts constitute ring back tones, a "no answer" situation occurs when such ring back tones persist until circuit T4 sets. Under these circumstances the called number, in effect, will be removed from the active list, and the system following a dead time, will automatically enter a new dialling cycle with the next number in the active list of the repertoire.

The low repetition rate of a ring back tone causes circuit T3 to set prior to the setting of bit Qn of the shift register. As a result, the active low level of output 2T3 will inhibit gate D1 causing its output to be a ONE regardless of the state of bit Qn.

Recalling that the completion of the dial routine had initiated the timing network of circuit T4 through input 2T4, T4 will set following a predetermined time. When this occurs, the pulse appearing at terminal 4T4 will pass through gate H2, due to the ONE level present at 1H2 and reset the active bit of the channel status register associated with the presently dialled telephone number.

The active low level at 3T4 initiates the reset routine as described above.

3. Answer (without answer signal)

Figure 5:
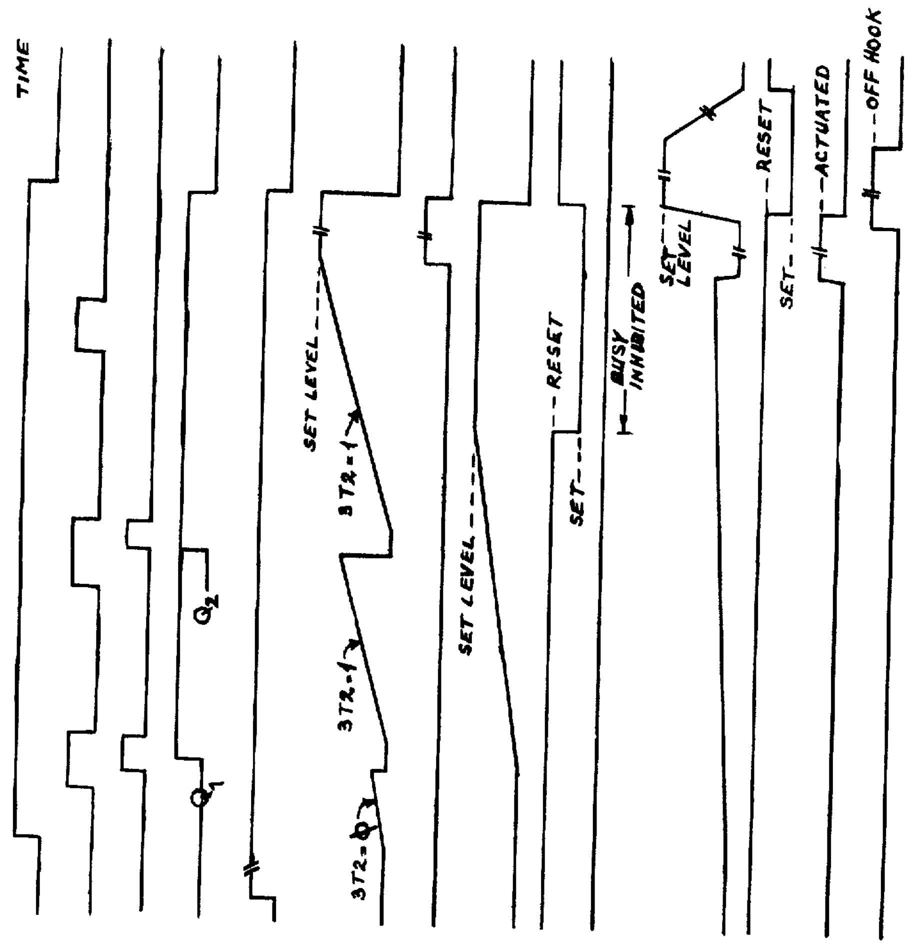
FIG. 5 shows wave forms and states of various components of the processor in response to ring back tones.

If the telephone system with which the processor is being used does not provide an answer signal such as a reversal of line polarity when the called station answers, answering may be inferred by the setting of circuit T2 which will occur in the absence of a tone burst, either within 8 seconds following entry into the tone identification mode, or within 5 seconds subsequent to a tone burst. As circuit T2 acts as indicated in line (g) of FIG. 5, the output of OR-gate E assumes a ONE level; consequently, the tape is gated continuously onto the line, the input channel is inhibited, circuit T5 is initiated, the buzzer is actuated and further charging of the timing network of circuit T4 which had been initiated on entry into the tone identification mode, is inhibited.

As soon as the handset is removed, the line sensor assumes a ONE level, which, in conjunction with the ONE level of E, sets T4 through gates F1 and F2. The pulse appearing at output terminal 4T4 resets the selected bit of the channel status register through gate H2. The active low level at 3T4 initiates the reset routine that resets T2. Consequently both tape and buzzer are deactivated and T5 is reset.

With the handset removed and the circuit T4 set, this circuit is latched to its high state through gate N. Upon replacing the handset, T4 unlatches, and automatic operation may resume as T4 resets to its quiescent state, the resetting time of T4 constituting the system dead time.

In the event that the attendant fails to remove the handset prior to the setting of T5, the channel selector is disabled and the reset routine is initiated through the ZERO level present at 1J3. Further automatic operation of the system will be suspended until the set push button 24 is depressed.

C. No dial tone

In the absence of a dial tone within approximately 8 seconds following the activation of the line, timing circuit T2 is set. The sequence of events that follow is identical to that described in connection with an answer with the exception that during a predial mode line 1 of the dial logic is at a ZERO level that inhibits H2 and consequently the channel status is unaffected.

IV. AUTOMATIC OPERATION WITH AN ANSWER SIGNAL

In the event that the telephone system with which the present invention is utilized provides an answer signal, such as voltage polarity reversal when the called station answers, sensor 33 will produce a high level output as soon as the called station answers. The operation of the sensor will be treated by the circuit shown in FIG. 2 as if the timing circuit T2 had set. Otherwise, the operation of the system previously described will be the same.

The logic shown in the FIG. 3 of the drawing is applicable to the general case in which an answer signal may or may not occur in response to an answered call. In systems that provide answer signals in response to an answered call, certain simplifying modifications of the logic can be carried out. For example, the timing of circuit T2 can be extended and its second timing mode eliminated by disconnecting terminal 3T2 from shift register SR. In this case, circuit T2 acts as a safeguard and is expected to operate only in the absence of a dial tone or of an incomplete connection. The setting of circuit T2 in the absence of a dial tone may actuate the buzzer as in the present case, whereas the setting of circuit T2 in the absence of tone bursts during the tone identification mode may set the "busy" control line. Consequently, circuit T4 will be set initiating the reset routine with the dialled number being maintained on the active list of the repertoire.

In addition, the connection between the dial logic and terminal 2B of gate B can be removed and this terminal of the gate is grounded. Thus, the tape mechanism is activated only in response to an answer signal.

The gate oscillator becomes unnecessary from a logic standpoint. However from a functional standpoint its presence improves the signal-to-noise ratio by adding an additional level of discrimination. For this reason its presence may be desirable even when used in telephone systems where polarity reversal occurs.

V. MODIFICATIONS

1. Tone identification

Tone identification may include different criteria: for example, the pulse generator can be permanently connected to the input channel during tone identification with the integrator charge-up limited to a level just exceeding the comparator upper trigger's level. The generator discharge currents during both active and inactive states are designed so that the generator output will follow a ring tone wave form but will remain set throughout a busy signal.

Shift register SR can be eliminated and the generator output connected directly into terminal 1T3 of timing circuit T3, NAND gates D1 and D2 eliminated and the output of T3 connected to terminals 2F1, 1H1 and 1H2. In the case of a busy signal the input level to T3 will remain high for a sufficient length of time to set it. The modified system, although simpler and in some systems essential due to the particular tone bursts involved, is more susceptible to noise than the system shown.

The scheme of tone identification disclosed herein could handle the so-called "precise tone plan" without requiring significant modification. To better utilize the mixed frequencies available with this plan, the tones may be frequency discriminated.

If so desired the timing circuits can be strictly digital.

2. Dialling

The pulse generator 42 described above can be utilized to generate the dialling pulses by disconnecting it from the input channel during the dial mode and having the dial logic conjunction with the comparator furnish the required charge and discharge input currents to generate to dial pulses and the dead time interval required between digits.

The dialling system described above discloses a dialling scheme in which dialling is accomplished by temporarily interrupting the line. The so-called "touch tone" dialling can be incorporated by substituting a buffer for the preset scaler 23. The decoded output would activate either an existing "touch tone", or a simulated version.

3. Memory

The precise type or design of the memory is not significant as far as the operation of the system is concerned. Accordingly it may consist of either a read/write memory, a read only memory or a combination thereof.

4. Multi-line operations

The processor described above utilizes a single telephone line and a single receiver. A number of extensions and/or outside telephone lines can be accomodated by the processor by suitably modifying the line interface to include a line status register and a line commutator. In its extended from the line interface constantly monitors the state of the lines and a call request will be granted provided both a line and the requesting extension are available. If a line is available the first unbusy requesting extension would be serviced.

The channel assignment may be replaced by an identifying code such as an extension number and the memory location handled automatically.

When a call is in progress both the code and the dialled number are displayed.

Since the logic provides an indication of a "busy" as well as a "no answer", these conditions can be indicated as they occur.

A call request may be examined as to its status, cancelled or reactivated by depositing the code number followed by operating an Examine, Reset or Set push button, respectively.

I claim:

1. In a telephone system, apparatus disposed between a calling telephone instrument and a telephone line for successively placing calls from a repertoire of numbers to be called, said apparatus comprising:

means including first and second sections, for storing a list of numbers to be called, said list being orginally stored in said first section;

means coupled to said telephone line for activating said telephone line in the absence of an incoming call to said apparatus;

first sensing means coupled to said telephone line and being operative to sense a dial tone signal, a ring back tone signal and a busy signal and to generate respective signals in response thereto, said first sensing means including means to sample for the telephone line signals at a frequency higher than the frequencies of the line signals;

selecting means coupled between said first sensing means and said means for storing and being operative in response to the first signal generated by said first sensing means to select a predetermined one of the numbers stored in the first section of said means for storing;

means for dialing having its output connection coupled to said telephone line and being operative to dial the selected one of the numbers to be called;

means coupled to said first sensing means, for generating a first deactivating signal in response to a busy signal and a second deactivating signal in response to a ring back tone signal that continues for a predetermined time; and means responsive to first and second deactivating signals for selecting a second number from the list of numbers to be called to thereby initiate a second dialing sequence.

2. Apparatus according to claim 1 second sensing means coupled to the telephone line and being operative to generate a signal in response to the occurrence of an off hook condition at the called number occurring subsequent to the sensing of a ring back tone signal by said first sensing means; and indicator means operative in response to the signal from said second sensing means to generate a sensory perceptive signal to thereby indicate the presence of a party at the called number.

3. Apparatus according to claim 2 further including:

recorded message means operative to provide at its output connection a recorded message; and gate means having a control connection coupled to said second sensing means and having an input and output connection coupled respectively between said recorded message means and said telephone line, said gate means being operative in response to the signal at its control connection generated by said second sensing means to transfer the recorded message from said recorded message means to said telephone line.

4. Apparatus according to claim 1 further including:

transferring means coupled between said means for storing and said means for generating first and second deactivating signals, and being operative in response to the first deactivating signal to transfer the selected number back to a predetermined location in the first section of said means for storing and being operative in response to said second deactivating signal to transfer the selected number to the second section of said means for storing whereby the selected number is transferred to the first section of said storing means if a busy tone signal is sensed on said telephone line and is transferred to the second section of said storing means if a ring back tone signal continues on the telephone line for more than the predetermined time.

5. In a telephone system, apparatus disposed between a calling party instrument and a telephone line for successively placing calls from a repertoire of numbers to be called, said apparatus comprising:

active storage means for storing a list of numbers to be dialed including first and second sections, said list being originally stored in said first section, dialing means coupled to said first section and the telephone line for dialing a number from said list of numbers, sensing means coupled to the telephone line for sensing the line signals at predetermined sensing intervals after completion of a dialing cycle, and for generating a first signal in the presence of a busy tone, a second signal in the presence of a ring back tone, a third signal in the presence of a ring back tone that persists for a predetermined period of time, and a fourth signal in the absence of line signals for a predetermined period of time; and audio means for providing an audio input to the line between said predetermined sensing intervals.

6. Apparatus according to claim 5 wherein said sensing means includes:

means for sampling the line signals at a frequency higher than the frequency of the line signals.

7. Apparatus according to claim 6 wherein said sensing means includes means for terminating said first signal at the end of a busy tone and said second signal at the end of a ring back tone and wherein said sampling means includes means responsive to said first and second signals and to said first and second signal terminating means for extending the sampling time until the termination of said first and second signals.

8. Apparatus according to claim 7, wherein said audio means includes means for gating said audio input onto the telephone line only between successive sampling times.

9. Apparatus according to claim 5 including means responsive to said first signal for deactivating the telephone line for a predetermined period of time.

10. Apparatus according to claim 5 including means responsive to said third signal for transferring the dialed number from the first section to the second section of said storage means, and for initiating the operation of said dialing means for dialing a second number from the list of numbers in said first section.

11. Apparatus according to claim 5 including indicator means responsive to said fourth signal for actuating a sensory perceptive indicator.

* * * * *